(12) United States Patent
Meiyappan et al.

(10) Patent No.: US 6,233,632 B1
(45) Date of Patent: May 15, 2001

(54) OPTIMIZING PERIPHERAL COMPONENT INTERCONNECT TRANSACTIONS IN A MIXED 32/64-BIT ENVIRONMENT BY ELIMINATING UNNECESSARY DATA TRANSFERS

(75) Inventors: Subramanian S. Meiyappan, Tempe; Peter Chambers, Phoenix, both of AZ (US)

(73) Assignee: VLSI Technology, Inc., San Jose, CA (US)

( * ) Notice: Subject to any disclaimer, the term of this patent is extended or adjusted under 35 U.S.C. 154(b) by 0 days.

(21) Appl. No.: 09/227,031

(22) Filed: Jan. 7, 1999

(51) Int. Cl.[7] .................................................. G06F 13/00
(52) U.S. Cl. ............................ 710/66; 710/106; 710/128
(58) Field of Search .................................. 710/11, 36–38, 710/58–68, 105–106, 126–129

(56) References Cited

U.S. PATENT DOCUMENTS

| | | | | |
|---|---|---|---|---|
| 5,379,443 | * | 1/1995 | Margulis ................................ 710/21 |
| 5,550,989 | * | 8/1996 | Santos .................................. 710/126 |
| 5,625,847 | * | 4/1997 | Ando et al. ............................ 710/60 |
| 5,781,918 | * | 7/1998 | Lieberman et al. ..................... 711/5 |
| 5,884,052 | * | 3/1999 | Chambers et al. ................... 710/107 |
| 5,909,557 | * | 6/1999 | Betker et al. ......................... 710/104 |
| 5,963,722 | * | 10/1999 | Carter .................................. 710/129 |
| 5,987,555 | * | 11/1999 | Alzien et al. ......................... 710/129 |
| 6,044,225 | * | 3/2000 | Spencer et al. ....................... 395/872 |

* cited by examiner

*Primary Examiner*—Christopher B. Shin
(74) *Attorney, Agent, or Firm*—Wagner, Murabito & Hao LLP

(57) ABSTRACT

A system and method for eliminating unnecessary data transfers (e.g., null data phase transfers) in a computer system. The computer system comprises a bus, a target device coupled to the bus, and an initiator device coupled to the bus. The initiator device is adapted to transfer a data byte and a signal corresponding to the data byte over the bus to the target device, wherein the signal is equal to a first value to indicate that the target device is to accept the data byte and the signal is equal to a second value to indicate that the target device is to disregard the data byte. The initiator device is further adapted to decode the signal for each of a plurality of data bytes. The initiator device withholds transferring a subset of the data bytes to the target device when the signal corresponding to each of the data bytes in the subset is equal to the second value, thereby eliminating unnecessary data transfers.

21 Claims, 5 Drawing Sheets

OPTIMIZING PERIPHERAL COMPONENT INTERCONNECT TRANSACTIONS IN A MIXED 32/64-BIT ENVIRONMENT BY ELIMINATING UNNECESSARY DATA TRANSFERS

TECHNICAL FIELD

The present invention pertains to the field of computer system bus architectures. More specifically, the present invention pertains to a method for optimizing data transfer in peripheral component interconnect bus systems.

BACKGROUND ART

A bus architecture of a computer system conveys much of the information and signals involved in the computer system's operation. In a typical computer system, one or more buses are used to connect a central processing unit (CPU) to a memory and to input/output devices so that data and control signals can be readily transmitted between these different components. When the computer system executes its programming, it is imperative that data and information flow as fast as possible in order to make the computer system as responsive as possible to the user. With many peripheral devices and subsystems, such as graphics adapters, full motion video adapters, small computer systems interface (SCSI) host bus adapters, and the like, it is imperative that large block data transfers be accomplished expeditiously. These applications are just some examples of peripheral devices and subsystems which benefit substantially from a very fast bus transfer rate.

Much of the computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose.

The electronics industry has, over time, developed several types of bus architectures. The PCI (peripheral component interconnect) bus architecture has become one of the most widely used and widely supported bus architectures in the industry. The PCI bus was developed to provide a high speed, low latency bus architecture from which a large variety of systems could be developed.

A PCI specification is used to establish standards to facilitate uniformity and compatibility of PCI devices operating in a PCI bus architecture. Initially, the PCI specification addressed only the use of 32-bit devices and 32-bit transactions, but the specification has since been extended to 64-bit devices and 64-bit transactions. Hence, a typical PCI bus system can include both 64-bit and 32-bit devices.

Prior Art FIG. 1 shows a simplified exemplary PCI bus architecture 100 implemented, for example, in a computer system. PCI bus 120 is coupled to PCI initiator 110. PCI bus 120 is also coupled to each of PCI target devices 112 and 114. PCI target 112 is a 32-bit target device and PCI target 114 is a 64-bit target device. In addition, PCI bus 120 is a 64-bit bus and PCI initiator 110 is a 64-bit device.

PCI initiator 110 can be integrated into bus bridge 130, as shown, and bus bridge 130 in turn is used to couple PCI bus 120 to a host bus (not shown). Bus bridge 130 is typically a bi-directional bridge and is made up of numerous components; for simplicity, bus bridge 130 is shown as comprising only PCI initiator 110.

PCI bus 120 is comprised of functional signal lines such as, for example, interface control lines, address/data lines, error signal lines, and the like. Each of PCI target devices 112 and 114 are coupled to the functional signal lines comprising PCI bus 120. The functional signal lines provide a data path between PCI initiator device 110 and the PCI target devices.

With reference now to Prior Art FIG. 2, timing diagram 200 is provided exemplifying a simplified 64-bit transaction according to the prior art. Timing diagram 200 illustrates a 64-bit transaction between a 64-bit initiator device and a 32-bit target device over a PCI bus capable of supporting 64-bit transactions (e.g., PCI initiator 110, PCI target 112 and PCI bus 120 of Prior Art FIG. 1).

Referring still to Prior Art FIG. 2, a host device (not shown) requests a 64-bit write data transfer to PCI target 112; that is, PCI initiator 110 is to forward 64 bits (eight bytes) of data to PCI target 112. The 64 bits of data are formatted as two 32-bit operands, referred to as data-1 and data-2 in timing diagram 200.

Associated with each byte of data is a command/byte-enable (hereinafter, byte-enable, BE). Byte-enables are driven by PCI initiator 110 and read by PCI target 112. BE[3:0] corresponds to the lower 32-bit portion of the data (e.g., data-1) and BE[7:4] corresponds to the upper 32-bit portion of the data (e.g., data-2). Byte-enables are known in the art and are used to indicate the bytes to be transferred and the data path to be used to transfer the data. When the value of a byte-enable bit is equal to one, the byte-enable is said to be disabled and the data byte corresponding to that byte-enable is discarded.

Continuing with reference to Prior Art FIG. 2, PCI initiator 110 starts the 64-bit transaction during PCI clock cycle 1 by asserting the FRAME# and REQ64# signals. Generally, FRAME# is used to indicate the start of a transaction, and REQ64# to indicate that the transaction includes a 64-bit data transfer. These signals are known in the art and are as defined in the PCI specification.

In clock cycle 1, PCI initiator 110 also drives the address onto AD[31:0] (address/data bits 0 through 31). All devices on the PCI bus latch onto this address, and during clock cycle 2 they decode the address. The target named by the address (e.g., PCI target 112) claims the transaction in clock cycle 2 by asserting the DEVSEL# signal. In this case, the target device is a 32-bit device and so ACK64# is not asserted (assertion of ACK64# is used to indicate that the target device is a 64-bit device). However, at this point in the process, PCI initiator 110 does not know that the target device is a 32-bit device, and so in clock cycle 2 PCI initiator 110 drives data-1 onto the bus in AD[31:0] and data-2 onto the bus in AD[63:32] (address/data bits 32 through 63). PCI initiator 110 samples ACK64# deasserted and so recognizes that PCI target 112 is a 32-bit device. Accordingly, in clock cycle 3, PCI initiator retransmits data-2 over AD[31:0].

In some data transactions, all of the byte-enables associated with the upper portion of the 64-bits of data are disabled; that is, in some transactions, BE[7:4] is equal to 1 1 1 1. In the prior art, data-2 is still transmitted to PCI target 112 when BE[7:4] are all disabled; however, PCI target 112 disregards data-2 when that is the case. This is referred to as a null data-phase transfer.

As seen by timing diagram 200, a clock cycle is needed to transmit data-2 even though the data contained therein are discarded by the PCI target. Therefore, the prior art is problematic because a clock cycle is unnecessarily consumed by the null data-phase transfer. Any subsequent activities associated with the present transaction are also delayed by one clock cycle. In addition, during the present transaction, PCI initiator 110 requires ownership of PCI bus 120, and thus the PCI bus is not available for other transactions. Thus, in the prior art, other transactions are also delayed because a portion of the computer system's data transfer bandwidth is consumed by the unnecessary clock cycle. Therefore, in the prior art, the system's available bandwidth is not being optimally utilized. These disadvantages are especially significant when multiplied by the number of transactions that occur on the PCI bus.

Another disadvantage to the prior art is that power is expended due to the null data-phase transfer from a 64-bit initiator to a 32-bit target. As shown by timing diagram 200, PCI initiator 110 asserts REQ64#, drives signals for BE[7:4], and drives data down AD[63:32]; however, these actions prove to be unnecessary because in actuality only 32 bits of data are transferred over AD[31:0] and BE[7:4] are all disabled. Therefore, the prior art is problematic because the unnecessary consumption of power is contrary to the goal of low power consumption called for in the PCI specification. In addition, laptop computer systems and the like are frequently powered by batteries, and thus another disadvantage to the prior art is that the computer system's battery may need to be recharged more frequently, thereby inconveniencing the user and perhaps shortening battery life.

Accordingly, what is needed is a method and/or system that eliminates or reduces the occurrence of the null data-phase transfer as described above, in order to more effectively utilize the computer system's data transfer bandwidth. What is further needed is a system and/or method that addresses the above need while reducing power consumption. The present invention provides a novel solution to the above needs.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a system and method that eliminate or reduce the occurrence of the null data-phase transfer, thus more effectively utilizing the computer system's data transfer bandwidth. The present invention also addresses the above need while reducing power consumption.

The present invention is a system and method for reducing or eliminating data transfers in a computer system when the byte-enables associated with the data bytes to be transferred are all disabled. The computer system comprises a bus, a target device coupled to the bus, and an initiator device coupled to the bus. The initiator device is adapted to transfer a data byte and a signal corresponding to the data byte (e.g., a byte-enable) over the bus to the target device, wherein the signal is equal to a first value to indicate that the target device is to accept the data byte and the signal is equal to a second value to indicate that the target device is to disregard the data byte. The initiator device is further adapted to decode the signal for each of a plurality of data bytes. The initiator device withholds transferring a subset of the data bytes to the target device when the signal corresponding to each of the data bytes in the subset is equal to the second value, thereby eliminating unnecessary data transfers.

In one peripheral component interconnect (PCI) embodiment, the bus, the initiator device, and the target device are PCI devices. The target device is a 32-bit device and the initiator device is a 64-bit device. When the byte-enables for the subset of data bytes corresponding to the upper 32 bits of a 64-bit transaction (e.g., byte enables 4 through 7 corresponding to address/data bits 32 through 63) are all disabled, then the target device should disregard that subset of data bytes. Accordingly, the initiator device withholds transferring that subset of data bytes, thus eliminating a null data-phase transfer. The data bytes are thus transferred in a single 32-bit transaction instead of two 32-bit transactions, thus saving one clock cycle.

DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
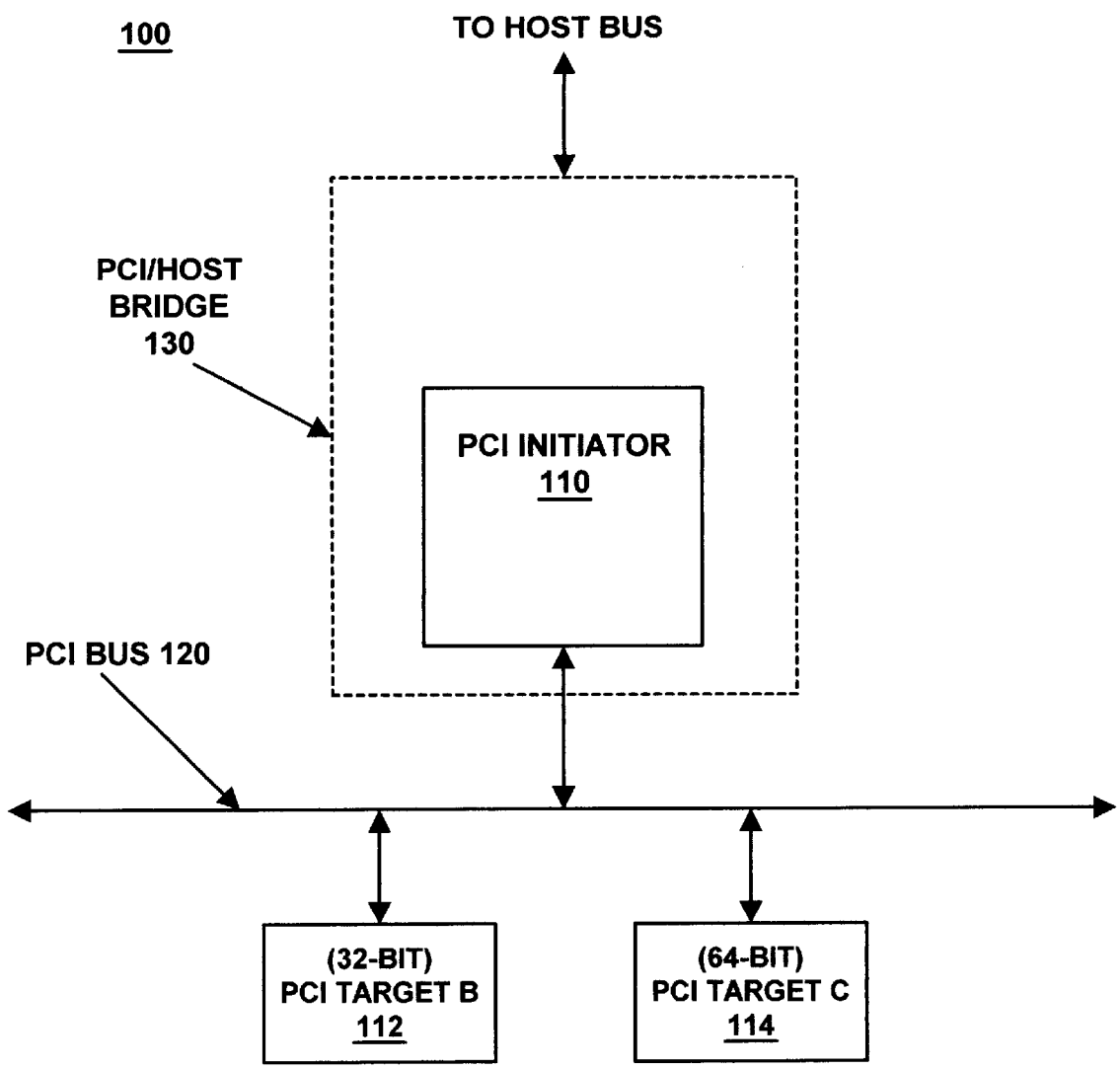
FIG. 1 is a block diagram of a simplified exemplary peripheral component interconnect (PCI) bus architecture of the prior art.
Figure 2:
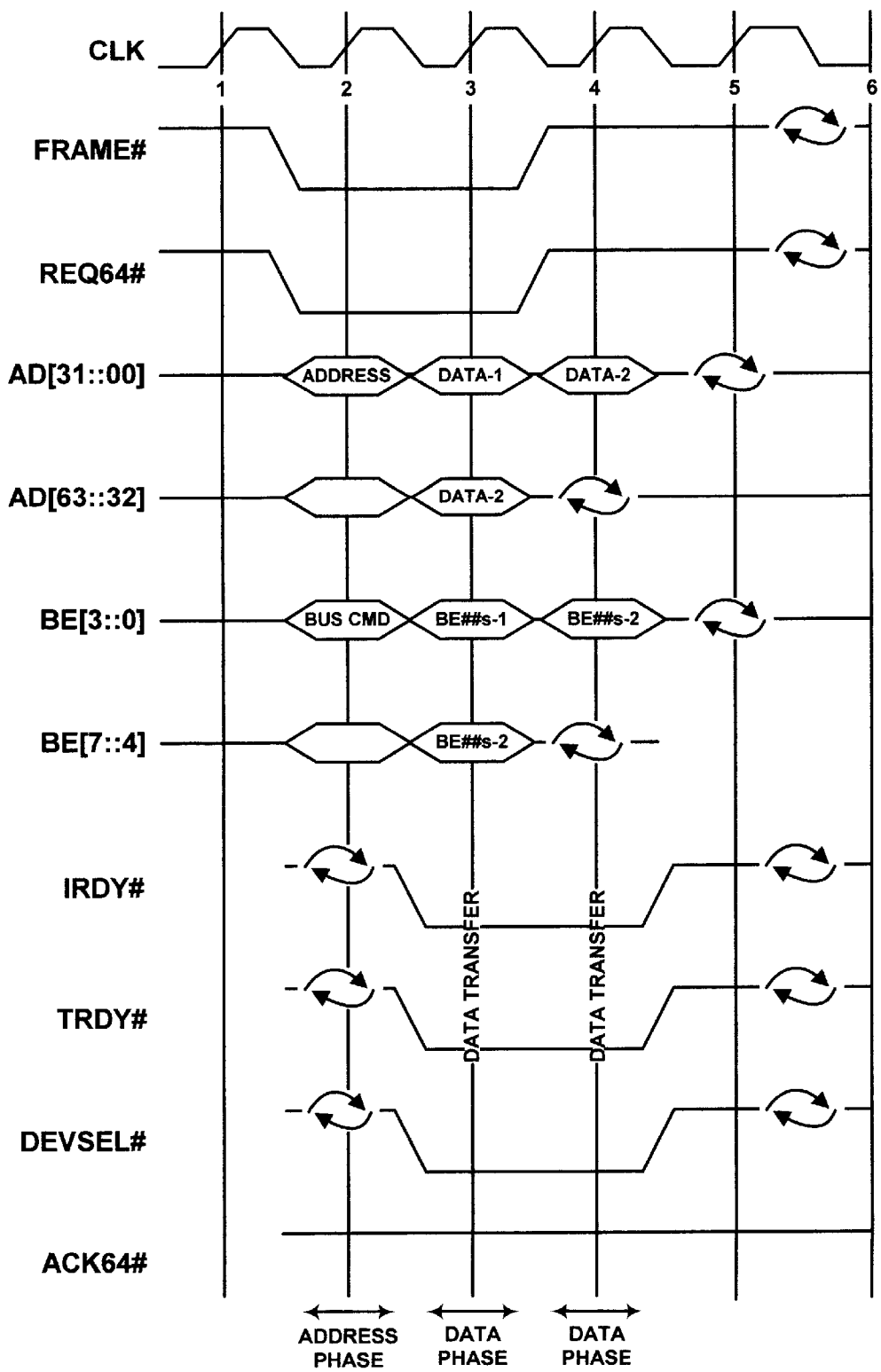
FIG. 2 illustrates a timing diagram showing a transaction in accordance with the prior art.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities.

Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

In the discussion of the embodiments which follow, the initiator device, target devices and bus are peripheral component interconnect (PCI) compliant devices. As such, the following discussions are provided in the context of a PCI-compliant bus system. However, it is understood that other configurations of a bus system may be used in accordance with the present invention, such as, for example, Micro Channel, EISA (Extended Industry Standard Architecture), and the like.

Figure 3:
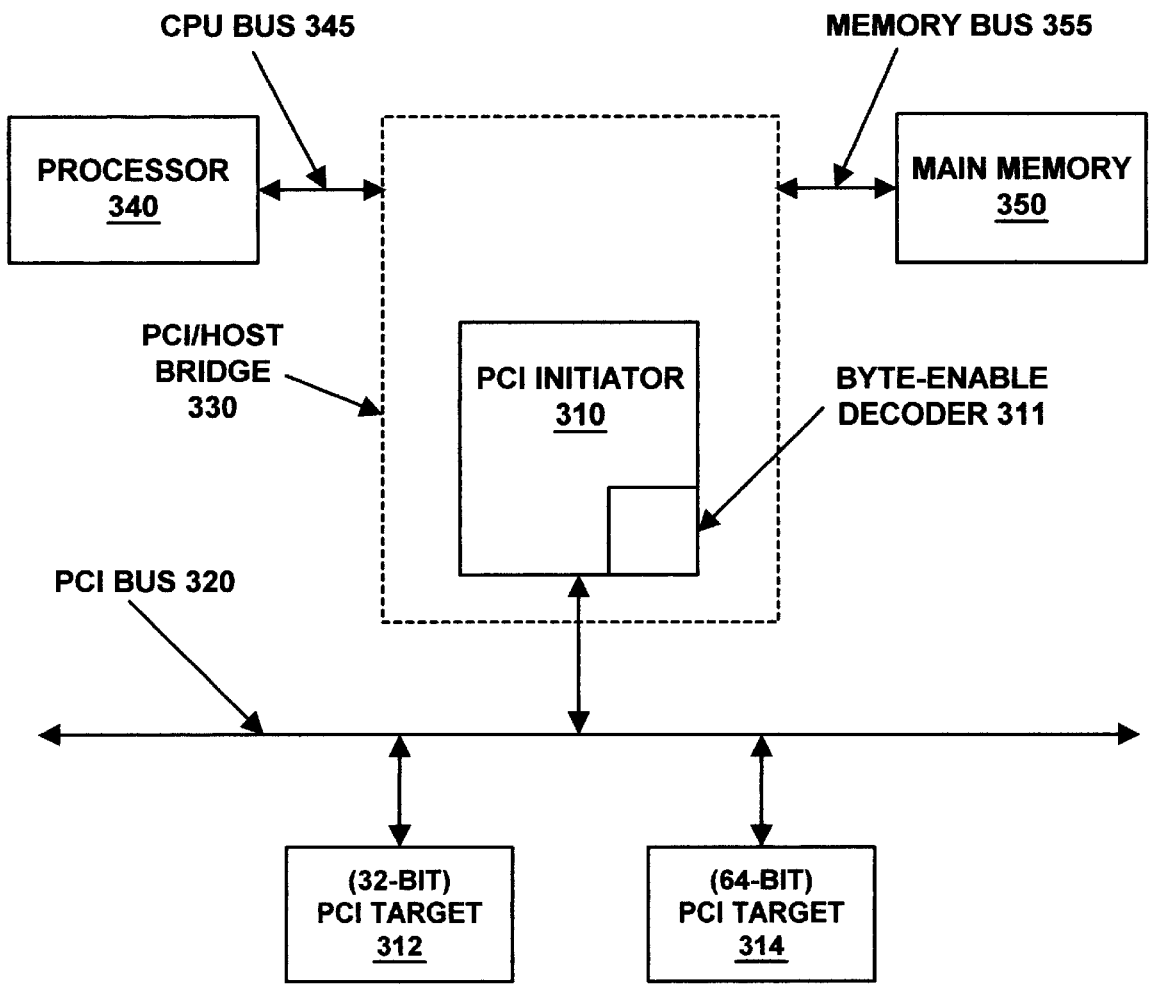
FIG. 3 is a block diagram of an exemplary PCI bus architecture implemented in a computer system in accordance with one embodiment of the present invention.

Refer now to FIG. 3, which shows an exemplary PCI bus system implemented in computer system 300 in accordance with a PCI-compliant embodiment of the present invention. The PCI bus system of computer system 300 includes PCI bus 320 coupled to PCI/host bridge 330. PCI/host bridge 330 is a bi-directional PCI bridge (for simplicity, the elements of a bi-directional bridge other than PCI initiator 310 are not shown). PCI/host bridge 330 is used to couple PCI bus 320 to processor 340 via central processing unit (CPU) bus 345 and to main memory 350 via memory bus 355. PCI bus 320 is also coupled to 32-bit PCI target 312 and 64-bit PCI target 314.

In the present embodiment, PCI initiator 310 is integrated into PCI/host bridge 330. In accordance with the present embodiment of the present invention, PCI initiator 310 implements a mechanism (e.g., byte-enable decoder 311) for decoding the byte-enables associated with the data bytes in a data transaction. In the present embodiment, byte-enable decoder 311 is implemented as hardware in an integrated circuit in PCI initiator 310. Other methods of implementation are permitted in accordance with the present invention; for example, byte-enable decoder 311 can be implemented as software programmed into PCI initiator 310.

Figure 4:
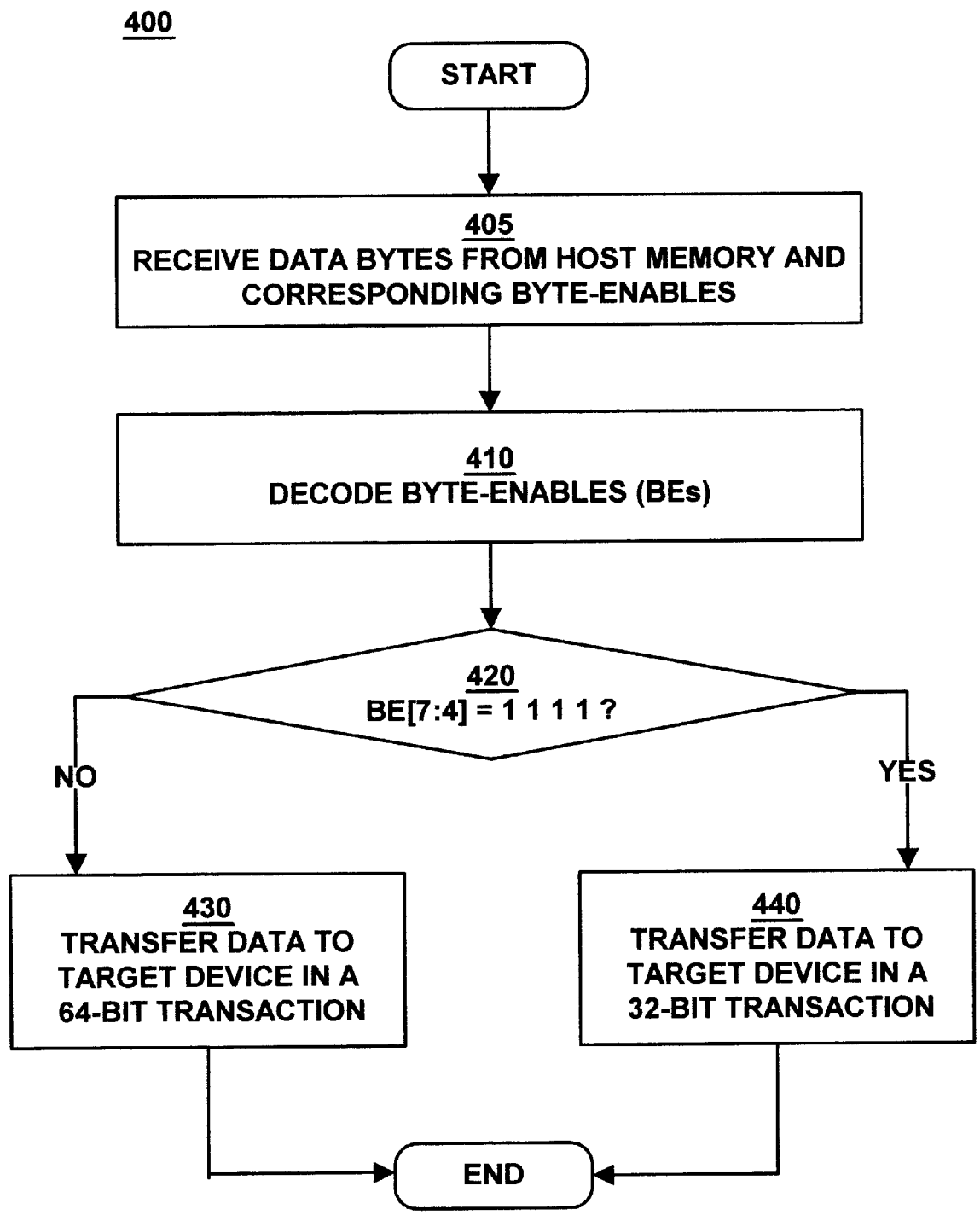
FIG. 4 is a flowchart of a process for optimizing data transfers in accordance with one embodiment of the present invention.

FIG. 4 is a flowchart of process 400 used in accordance with one embodiment of the present invention to eliminate unnecessary data transfers. In the present embodiment, process 400 is implemented via PCI initiator 310 of FIG. 3, specifically byte-enable decoder 311. Process 400 is applicable to a 64-bit transaction between a 64-bit initiator device (e.g., PCI initiator 310 of FIG. 3) and a 32-bit target device (e.g., PCI target 312 of FIG. 3). However, per the PCI specification, PCI target 312 does not claim the transaction and does not identify itself as a 32-bit device until after the transaction has been initiated by PCI initiator 310. Hence, when the data transfer is initiated, PCI initiator 310 is not aware that PCI target 312 is a 32-bit device.

In step 405, PCI/host bridge 330 (FIG. 3) has received data bytes from, for example, main memory 350 (FIG. 3) and is to transfer the data bytes via PCI initiator 310 to PCI target 312. For a 64-bit transaction, there are eight bytes of data. Per the PCI specification, associated with each data byte is a byte-enable; therefore, there are eight byte-enables. A 64-bit transaction is typically represented by two 32-bit data packages; one data package is transmitted over PCI bus 320 (FIG. 3) via address/data bits 0 through 31 (AD[31:0]) and the other is transmitted via address/data bits 32 through 63 (AD[63:32]). Byte-enables 0 through 3 (e.g., BE[3:0]) correspond to the lower 32 bits of the 64-bit transaction (e.g., AD[31:0]), and byte-enables 4 through 7 (e.g., BE[7:4]) correspond to the upper 32 bits of the 64-bit transaction (e.g., AD[63:32]).

Per the PCI specification, the byte-enables are used to indicate to the target device the bytes to be transferred and the data path to be used to transfer the data bytes. The byte-enables provide a signal to the target device, directing the target either to accept the corresponding data byte and write it to a memory address, or to disregard the data in the corresponding data byte.

In the present embodiment, the byte-enable is a binary signal characterized by either a one or a zero. When the byte-enable bit is set equal to zero, the byte-enable is enabled and the PCI target will accept the corresponding data byte. When the byte-enable bit is equal to one, the byte-enable is disabled and the target device will disregard the corresponding data byte.

In step 410, in the present embodiment of the present invention, PCI initiator 310 (specifically, byte-enable decoder 311) decodes the byte-enables before the data bytes are transferred to PCI target 312. Thus, PCI initiator 310 determines the value (e.g., either zero or one) for each of the byte-enables corresponding to each of the data bytes to be transferred.

In step 420, in accordance with the present embodiment of the present invention, PCI initiator 310 (specifically, byte-enable decoder 311) determines whether or not all of the byte-enables associated with the subset of the data bytes comprising the upper 32 bits (e.g., AD[63:32]) of the 64-bit transaction are disabled. That is, after decoding the byte-enables, PCI initiator 310 determines whether BE[7:4] are all equal to one (BE[7:4]=1 1 1 1).

In step 430, if all of the byte-enables corresponding to the upper 32 bits of the 64-bit transaction are not equal to one, then some or all of the data bytes in the upper 32-bits are to be transferred to the PCI target. Accordingly, the 64-bit transaction is completed in the typical manner per the PCI specification.

In step 440, however, if all of the byte-enables corresponding to the upper 32 bits of the 64-bit transaction are equal to one, then all of the data bytes in the upper 32-bits are to be disregarded by the PCI target. Hence, in accordance with the present invention, PCI initiator 310 has prior knowledge of the byte-enables and does not transfer all 64-bits to the PCI target. Instead, the 64-bit transaction is converted by PCI initiator 310 into a single 32-bit transaction comprising only the lower 32 bits of data (e.g., AD[31:0]). In this manner, the present invention eliminates the null data-phase transfer that occurs when BE[7:4] are disabled.

Continuing with step 440, PCI initiator 310 then transfers only the lower 32 bits of data to PCI target 312. The upper 32-bits of the data are not transmitted because those data would be disregarded by PCI target 312. Thus, the present invention eliminates the null data-phase transfer that would otherwise occur when BE[7:4] are all disabled.

Figure 5:
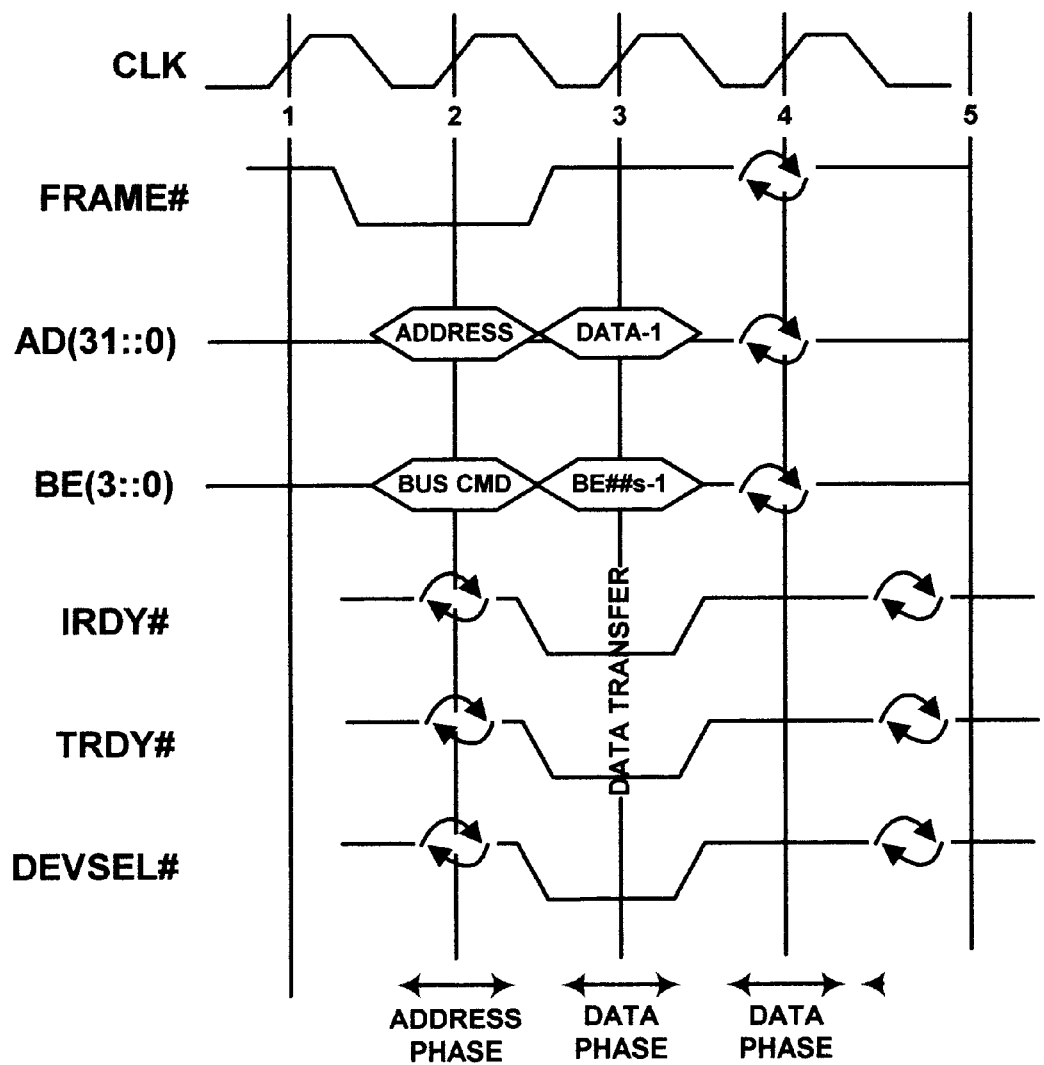
FIG. 5 illustrates a timing diagram for a transaction in accordance with one embodiment of the present invention.

FIG. 5 is an illustration of timing diagram 500 exemplifying a 64-bit transaction between a 64-bit initiator device (e.g., PCI initiator 310 of FIG. 3) and a 32-bit target (e.g., PCI target A 312 of FIG. 3) in accordance with the present invention. In timing diagram 500, the byte-enables associated with the upper 32 bits of the 64-bit transaction (e.g., BE[7:4]) are decoded by PCI initiator 310 before the transaction in accordance with the present embodiment of the present invention. In the present transaction, BE[7:4] are all equal to one. Hence, as described above in conjunction with FIG. 4, PCI initiator 310 has determined that only the lower 32-bits of the transaction are to be transferred to PCI target 312.

With reference to FIGS. 3 and 5, PCI initiator 310 starts the transaction during PCI clock cycle 1 by asserting the FRAME# signals. In the present transaction, in accordance with the present embodiment of the present invention, PCI initiator 310 does not assert REQ64# because the initiator device has ascertained that only 32 bits of data are to be transferred, as explained above. Accordingly, PCI initiator 310 only drives BE[3:0] and does not drive BE[7:4].

Also in clock cycle 1, PCI initiator 310 drives the target address onto PCI bus 320 over AD[31:0]. PCI target A 312 receives the target address and decodes the target address in clock cycle 2. Recognizing the target address as its address, PCI target A 312 claims the transaction by asserting DEVSEL# in clock cycle 2. Because REQ64# was not asserted, an ACK64# signal is not required.

Also in clock cycle 2, PCI initiator 310 drives the 32-bit transaction (e.g., data-1) over AD[31:0]. In accordance with the present invention, a second 32-bit transaction is not needed nor does AD[63:32] need to be driven in clock cycle 3; the data bytes in the second transaction would only be disregarded by PCI target 312 because BE[7:4] are all zero, and so there is no need to transfer that data. Thus, in accordance with the present invention, the data transfer is completed in clock cycle 2.

Therefore, the present invention saves at least one clock cycle by eliminating the null data-phase transfer when the byte-enables associated with the upper 32 bits of a 64-bit transaction are disabled. Consequently, subsequent activities associated with the present transaction can be performed and completed at least one clock cycle quicker. Other transactions can then take place sooner over PCI bus 320. Considering the number of transactions that occur in a PCI bus system, the improvement in the speed at which data transfers are completed due to the present invention is significant. The present invention therefore optimizes the utilization of computer system's data transfer bandwidth.

In addition, as explained in conjunction with FIG. 5, in accordance with the present invention REQ64# is not asserted, signals are not driven for BE[7:4], and data are not driven over AD[63:32]. As such, the present invention reduces the amount of power consumed, which is consistent with the goal of the PCI specification. Because power consumption is reduced, the present invention is expected to reduce the frequency of battery charging, increasing the life of the computer system's batteries and making the system more convenient to the user.

In summary, the present invention provides a system and method that eliminate or reduce the occurrence of the null data-phase transfer, thus more effectively utilizing the computer system's data transfer bandwidth while also reducing power consumption.

The preferred embodiment of the present invention, optimizing peripheral component interconnect transactions in a mixed 32/64-bit environment by eliminating unnecessary data transfers, is thus described. While the present invention has been described in particular embodiments, it should be appreciated that the present invention should not be construed as limited by such embodiments, but rather construed according to the following claims.

What is claimed is:

1. A computer system comprising:

a bus;

a target device coupled to said bus; and an initiator device coupled to said bus and adapted to transfer a data byte and a signal corresponding to said data byte over said bus to said target device, wherein said signal is a first value to indicate that said target device is to accept said data byte and said signal is a second value to indicate that said target device is to disregard said data byte;

said initiator device further adapted to decode said signal for each of a plurality of data bytes and to withhold transferring a subset of said data bytes to said target device when said signal corresponding to each of said data bytes in said subset is said second value, thereby eliminating unnecessary data transfers.

2. The computer system of claim 1 wherein said bus, said initiator device, and said target device are peripheral component interconnect (PCI) compliant devices.

3. The computer system of claim 1 wherein said signal is a byte-enable signal.

4. The computer system of claim 1 wherein said first value and said second value of said signal are binary values selected from zero and one.

5. The computer system of claim 1 wherein said first value of said signal indicates said signal is enabled and said second value indicates said signal is disabled.

6. The computer system of claim 1 wherein said target device is a 32-bit device and said initiator device is a 64-bit device.

7. The computer system of claim 1 wherein said subset of said plurality of data bytes corresponds to address/data bits 32 through 63 of said bus.

8. In a computer system comprising a bus, a target device, and an initiator device, a method implemented by said initiator device to eliminate unnecessary data transfers to said target device, said method comprising the steps of:

a) receiving a signal that corresponds to a data byte, wherein said signal is for indicating to said target device whether said target device is to accept said data byte, said signal a first value to indicate said target device is to accept said data byte and said signal a second value to indicate said target device is to disregard said data byte;

b) decoding said signal for each of a plurality of data bytes; and c) withholding transfer of a subset of said data bytes to said target device when said signal for each of said data bytes in said subset is said second value.

9. The method of claim 8 wherein said bus, said initiator device, and said target device are peripheral component interconnect (PCI) compliant devices.

10. The method of claim 8 wherein said signal is a byte-enable signal.

11. The method of claim 8 wherein said first value and said second value of said signal are binary values selected from zero and one.

12. The method of claim 8 wherein said first value of said signal indicates said signal is enabled and said second value indicates said signal is disabled.

13. The method of claim 8 wherein said target device is a 32-bit device and said initiator device is a 64-bit device.

14. The method of claim 8 wherein said subset of said data bytes corresponds to address/data bits 32 through 63 of said bus.

15. A computer system comprising:

a bus;

a target device coupled to said bus;

an initiator device coupled to said bus, said initiator device adapted to transfer a data byte and a signal corresponding to said data byte over said bus to said target device, wherein said signal is a first value to indicate said target device is to accept said data byte and said signal is a second value to indicate that said target device is to disregard said data byte, said initiator device further adapted to withhold transferring a subset of said data bytes to said target device when said signal corresponding to each of said data bytes in said subset is said second value; and a byte-enable decoder coupled to said initiator device, said byte-enable decoder adapted to decode said signal for each of a plurality of data bytes and identify to said initiator device a value for said signal.

16. The computer system of claim 15 wherein said bus, said initiator device, said target device and said byte-enable decoder are peripheral component interconnect (PCI) compliant devices.

17. The computer system of claim 15 wherein said signal is a byte-enable signal.

18. The computer system of claim 15 wherein said first value and said second value of said signal are binary values selected from zero and one.

19. The computer system of claim 15 wherein said first value of said signal indicates said signal is enabled and said second value indicates said signal is disabled.

20. The computer system of claim 15 wherein said target device is a 32-bit device and said initiator device is a 64-bit device.

21. The computer system of claim 15 wherein said subset of said plurality of data bytes corresponds to address/data bits 32 through 63 of said bus.

* * * * *